US008683525B2

(12) United States Patent  (10) Patent No.: US 8,683,525 B2
Ellis et al.  (45) Date of Patent: Mar. 25, 2014

(54) INTERACTIVE ELECTRONIC TELEVISION PROGRAM GUIDE WITH DATABASE CONFIGURABILITY

(75) Inventors: Michael D. Ellis, Boulder, CO (US); Daniel C. Hagenbuch, Holland, PA (US)

(73) Assignee: United Video Properties, Inc., Santa Clara, CA (US)

( * ) Notice: Subject to any disclaimer, the term of this patent is extended or adjusted under 35 U.S.C. 154(b) by 69 days.

(21) Appl. No.: 13/154,069

(22) Filed: Jun. 6, 2011

(65) Prior Publication Data

US 2012/0017244 A1  Jan. 19, 2012

Related U.S. Application Data

(63) Continuation of application No. 11/111,261, filed on Apr. 20, 2005, now Pat. No. 7,987,480, which is a continuation of application No. 09/063,333, filed on Apr. 20, 1998, now Pat. No. 6,928,653.

(60) Provisional application No. 60/063,988, filed on Nov. 6, 1997.

(51) Int. Cl.
*H04N 7/173* (2011.01)
*H04N 5/445* (2011.01)
*H04N 7/16* (2011.01)

(52) U.S. Cl.
USPC ............................. 725/50; 725/44; 725/134

(58) Field of Classification Search
USPC .................................. 725/39, 44, 50, 134
See application file for complete search history.

(56) References Cited

U.S. PATENT DOCUMENTS

| | | |
|---|---|---|
| 5,038,211 A | 8/1991 | Hallenbeck |
| 5,568,635 A | 10/1996 | Yamaguchi |
| 5,589,892 A | 12/1996 | Knee et al. |
| 5,592,551 A | 1/1997 | Lett et al. |
| 5,652,613 A | 7/1997 | Lazarus et al. |
| 5,734,822 A | 3/1998 | Houha et al. |
| 5,742,677 A | 4/1998 | Pinder et al. |
| 5,754,940 A | 5/1998 | Smith et al. |
| 5,784,699 A | 7/1998 | McMahon et al. |
| 5,790,198 A | 8/1998 | Roop et al. |
| 5,822,753 A | 10/1998 | Takano |
| 5,835,734 A | 11/1998 | Alkalaj et al. |

(Continued)

FOREIGN PATENT DOCUMENTS

WO  WO 97/30549  8/1997

OTHER PUBLICATIONS

Rost, P., et al., "Keeping Track of the Program Flood" Components pp. 15-17, Apr. 1997.

(Continued)

*Primary Examiner* — Pankaj Kumar
*Assistant Examiner* — Reuben M Brown
(74) *Attorney, Agent, or Firm* — Ropes & Gray LLP

(57) ABSTRACT

An interactive television program guide system is provided in which an interactive television program guide is implemented on user television equipment containing a memory. The system allocates the memory among different categories of program guide data used by the program guide. When new channels are added to the channel line-up, the program guide adjusts its memory allocation accordingly. When it is desired to install a new non-program-guide application on the user television equipment in addition to the program guide, memory can be reallocated to accommodate the new application.

20 Claims, 12 Drawing Sheets

(56) References Cited

U.S. PATENT DOCUMENTS

| | | |
|---|---|---|
| 5,844,620 A | 12/1998 | Coleman et al. |
| 5,930,827 A | 7/1999 | Sturges |
| 6,005,561 A * | 12/1999 | Hawkins et al. ............ 715/234 |
| 6,005,631 A | 12/1999 | Anderson et al. |
| 6,020,880 A | 2/2000 | Naimpally |
| 6,038,571 A | 3/2000 | Numajiri et al. |
| 6,311,329 B1 | 10/2001 | Terakado et al. |
| 6,397,311 B1 | 5/2002 | Capps |
| 7,987,480 B2 * | 7/2011 | Ellis et al. ............ 725/39 |
| 2005/0193413 A1 | 9/2005 | Ellis et al. |
| 2012/0017244 A1 * | 1/2012 | Ellis et al. ............ 725/50 |

OTHER PUBLICATIONS

Hartwig, et al., "Broadcasting and Processing of Program Guides for Digital TV" SMPTE Journal pp. 727-732, Oct. 1997.

Rath, K., et al., "Set-Top Box Control Software: A Key Component in Digital Video" Philips Journal of Research pp. 185-199, vol. 50, No. 1/2, 1996.

Rosengren, "Electronic Programme Guides and Service Information" Philips Journal of Research pp. 253-265, vol. 50, No. 1/2, 1996.

* cited by examiner

FIG. 8

| | Any Program | Special Events | PPV Movies | Sporting Events | Non-PPV Movies | Regular Programs |
|---|---|---|---|---|---|---|
| Level 0 | 30 days | 30 days | 7 days | 7 days | 7 days | 7 days |
| Level 1 | 30 days | 30 days | 7 days | 7 days | 7 days | 6 days |
| Level 2 | 30 days | 30 days | 7 days | 7 days | 7 days | 5 days |
| Level 3 | 30 days | 30 days | 7 days | 7 days | 7 days | 4 days |
| Level 4 | 30 days | 30 days | 7 days | 7 days | 7 days | 3 days |
| Level 5 | 30 days | 30 days | 7 days | 7 days | 7 days | 2 days |
| Level 6 | 30 days | 30 days | 6 days | 6 days | 6 days | 1 day |
| Level 7 | 30 days | 30 days | 5 days | 5 days | 5 days | 1 day |
| Level 8 | 30 days | 30 days | 4 days | 4 days | 4 days | 1 day |
| Level 9 | 30 days | 30 days | 3 days | 3 days | 3 days | 1 day |
| Level 10 | 30 days | 30 days | 2 days | 2 days | 2 days | 1 day |
| Level 11 | 30 days | 30 days | 1 day | 1 day | 1 day | 1 day |
| Level 12 | 30 days | 30 days | 1 day | 1 day | 1 day | 1 day |
| Level 13 | 7 days | 7 days | 1 day | 1 day | 1 day | 1 day |
| Level 14 | 1 day | 1 day | 1 day | 1 day | 1 day | 1 day |

|  | Any Program | Special Events | PPV Movies | Sporting Events | Non-PPV Movies | Regular Programs |
|---|---|---|---|---|---|---|
| Level 0 | 30 days | 30 days | 7 days | 7 days | 7 days | 7 days |
| Level 1 | 30 days | 30 days | 7 days | 7 days | 7 days | 6 days |
| Level 2 | 30 days | 30 days | 7 days | 7 days | 7 days | 5 days |
| Level 3 | 30 days | 30 days | 7 days | 7 days | 7 days | 4 days |
| Level 4 | 30 days | 30 days | 7 days | 7 days | 7 days | 3 days |
| Level 5 | 30 days | 30 days | 7 days | 7 days | 7 days | 2 days |
| Level 6 | 30 days | 30 days | 7 days | 7 days | 7 days | 1 day |
| Level 7 | 30 days | 30 days | 6 days | 6 days | 6 days | 1 day |
| Level 8 | 30 days | 30 days | 5 days | 5 days | 5 days | 1 day |
| Level 9 | 30 days | 30 days | 4 days | 4 days | 4 days | 1 day |
| Level 10 | 30 days | 30 days | 3 days | 3 days | 3 days | 1 day |
| Level 11 | 30 days | 30 days | 2 days | 2 days | 2 days | 1 day |
| Level 12 | 30 days | 30 days | 1 day | 1 day | 1 day | 1 day |
| Level 13 | 7 days | 7 days | 1 day | 1 day | 1 day | 1 day |
| Level 14 | 1 day | 1 day | 1 day | 1 day | 1 day | 1 day |

FIG. 9

INTERACTIVE ELECTRONIC TELEVISION PROGRAM GUIDE WITH DATABASE CONFIGURABILITY

This application claims the benefit of U.S. provisional application No. 60/063,988, filed Nov. 6, 1997.

BACKGROUND OF THE INVENTION

This invention relates to television systems, and more particularly, to the use of memory in interactive television program guide systems.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive television program guides, which control user-interface functions, i.e. channel-selection or interactive program inspection, are typically implemented on set-top boxes. Although set-top boxes are often provided to subscribers with only the program guide application installed and a certain number of pre-determined channels, cable system operators often would like to have the capability to add more channels to their cable television channel line-up. Cable system operators may also want to install additional applications in the set-top boxes in their system when such features become available. For example, operators might wish to add application software to the set-top boxes to support a home shopping service, a home banking service, an Internet access service, or some other such service.

However, the amount of memory available in a set-top box is limited. Because the amount of memory required by a conventional program guide is fixed, it may not be possible to install new application software in a set-top box if the program guide application has already been installed. An example of an electronic program guide with a memory size that is fixed is shown in Lazarus U.S. Pat. No. 5,652,613. Although it might be possible to reserve the needed memory capacity for the future installation of new applications by initially using a program guide with a fairly small memory requirement, such a reduced-size program guide would generally not be able to provide the same level of functionality as a full-sized program guide.

It is therefore an object of the present invention to provide a system in which the memory requirements of a program guide may be adjusted when it is desired to install additional applications.

It is a further object of the present invention to provide a system in which the memory requirements of a program guide may be adjusted to accommodate the addition of new channels to the existing channel line-up.

SUMMARY OF THE INVENTION

These and other objects of the invention are accomplished in accordance with the principles of the present invention by providing an interactive electronic television program guide system in which a set-top box or comparable user television equipment on which a program guide is implemented has a configurable database of program guide data. A set-top box or comparable user television equipment stores various categories of television program guide data in the configurable database and maintains a database configuration record. The database configuration record allocates memory usage among the categories of program guide data.

The database configuration record may be based on a look-up table arrangement that contains information on the preferred memory allocation to be used when various amounts of memory are available. If it is desired to change the amount of memory used by the program guide due to the installation of new applications, the database configuration record may be used by the program guide to reallocate the memory in the set-top box.

The database configuration record may be provided to the set-top box using a number of different techniques. For example, the database configuration record may be provided from the same source used to provide the program guide data. If desired, the database configuration record may be provided at the cable system headend. The record may be addressed to all set-top boxes controlled by a particular cable system operator, all set-top boxes in a given cable system, an individual set-top box, or other suitable grouping.

An aspect of the invention relates to the use of various levels of data storage. For each level of storage, the database configuration record may specify a desired number of hours of television program listings data to store for each category of programming, as well as a desired number of hours of descriptions. There may be a default database configuration record for each version of the program guide, for each specific type of set-top box hardware, and for each memory configuration corresponding to a specific type of set-top box hardware.

The television program guide data preferably may be divided into categories such as pay-per-view special events, pay-per-view movies, programming on premium channels, all other movies, all other sporting events, and all other series. Each data storage level specifies how the program guide is to allocate individual portions of memory for the listings and descriptions corresponding to different categories of programming.

For example, a first level (level one) in the database configuration record might indicate that the program guide should store 30 days of program listings data and program descriptions data for pay-per-view events, seven days of program listings data and five days of program descriptions data for pay-per-view movies, seven days of program listings data and 12 hours of program descriptions data for programming on premium channels, etc. For level two, which requires that less memory be used by the program guide database, the database configuration record may decrease the amount of program listings data and program descriptions data that is to be retained by the program guide for certain categories.

In response to the introduction of a new application to the set-top box, a new database configuration record may be required. When a new database configuration record is received by the set-top box, it informs the program guide how it may use to store the program guide data. The program guide then purges any programming data that is not within its storage levels as specified by the new database configuration record. New incoming television programming data is also controlled by the data storage level. When, the program guide receives new programming data, the program guide checks the current level of the database configuration record. If the new data fits in memory using the current definition of the data storage level in the database configuration record, i.e., information about listings and descriptions of pay-per-view events within 30 days as described above for level one, the program guide stores the data. If the data extends beyond that definition, e.g., the data contains information about listings and descriptions of pay-per-view events that are 32 days into the future, the extra data will be discarded.

When the program guide determines that, for the present storage level, sufficient memory no longer exists (e.g., because new channels were added to the cable television line-up or a new non-program-guide application was added to the set-top box memory), the program guide deletes all unnecessary data and changes to a program listings level and a program descriptions level that requires less memory and provides less programming data. The program guide can become aware of this shortage of memory in two different ways: 1) the installation of new channels in the line-up may alert the program guide that its available memory has been reduced or 2) as mentioned above, a new database configuration record may be sent from the cable operator to the program guide to inform the program guide of a new application that will be installed in the memory.

When the program guide determines that additional memory is available, for example due to the removal of an application from the set-top box or the removal of channels from the television channel line-up, the program guide changes to a program listings level and a program descriptions level which uses more memory for the program guide database and can therefore provide more complete programming information to the user of the program guide.

The database configuration record may also be used to specify a default startup level. The default startup level ensures that whenever the set-top box is turned on after a power interruption, the program guide starts at a lower level of storage and gradually increases to the predetermined maximum program listings level and maximum program descriptions level for the program guide.

The database configuration record may be stored in non-volatile memory in the set-top box, so that the program guide continues to allocate memory properly after a power loss. Data such as program listings data and program descriptions data may be stored in volatile memory and reacquired after a power loss.

Further features of the invention, its nature and various advantages will be more apparent from the accompanying drawings and the following detailed description of the preferred embodiments.

BRIEF DESCRIPTION OF THE DRAWINGS

FIG. 8 is a table showing illustrative program listings levels in accordance with the present invention.

FIG. 9 is a table showing illustrative program descriptions levels in accordance with the present invention.

DETAILED DESCRIPTION OF THE PREFERRED EMBODIMENTS

Figure 1:
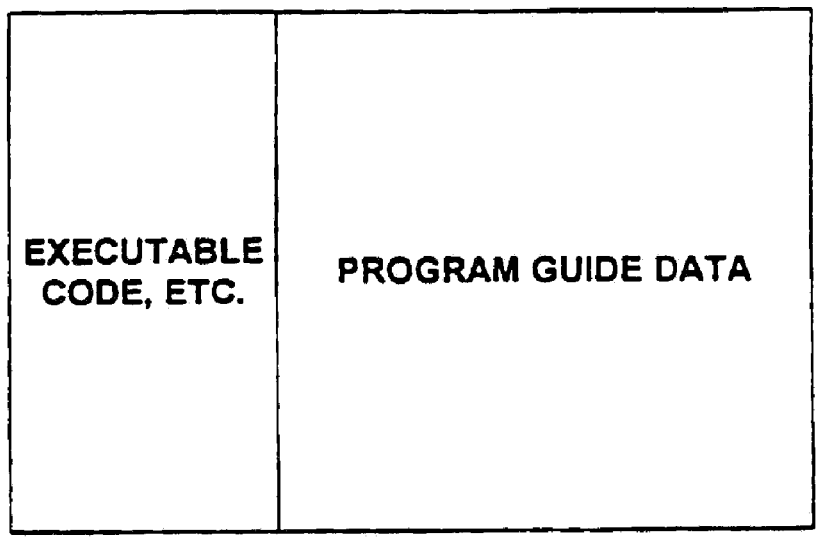
FIG. 1 is a schematic diagram of a known interactive television program guide system.
Figure 2:
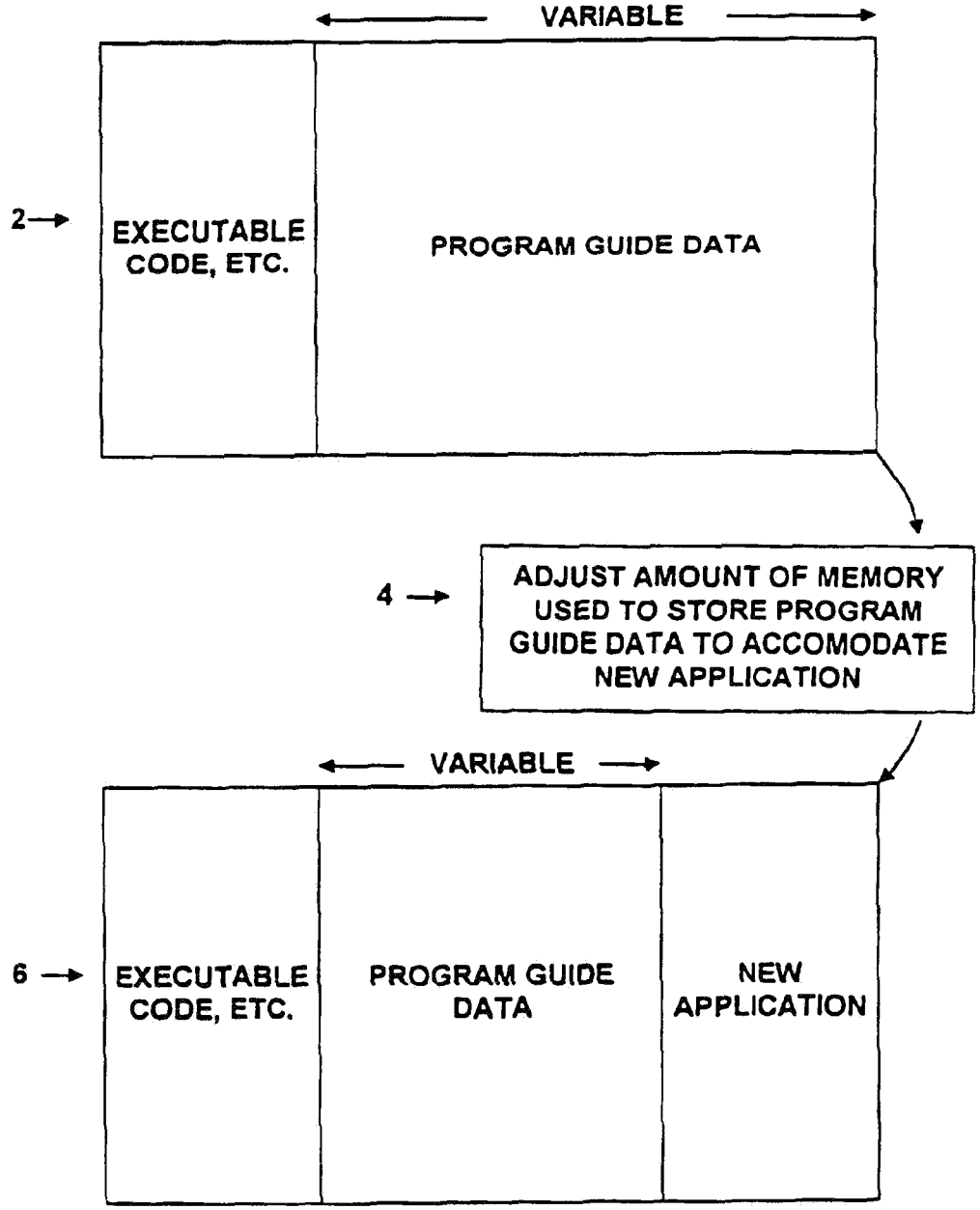
FIG. 2 is a schematic diagram of a known interactive television program guide system according to the present invention.

In known television program guide applications, the amount of memory reserved for program guide data is fixed. An example of such a system is shown in FIG. 1. In FIG. 2, an interactive television program guide application having a variable amount of memory for program guide data according to the principles of invention is shown at step 2. The variability of the amount of memory permits the interactive television program guide to accommodate new applications (or new channel data, see FIG. 12) as necessary. Step 4 illustrates an example of the interactive television program guide adjusting to accommodate a new application. Step 6 shows the interactive television program guide allocating a reduced amount of memory for program guide data while simultaneously allocating a portion of the memory for a new application.

Figure 3:
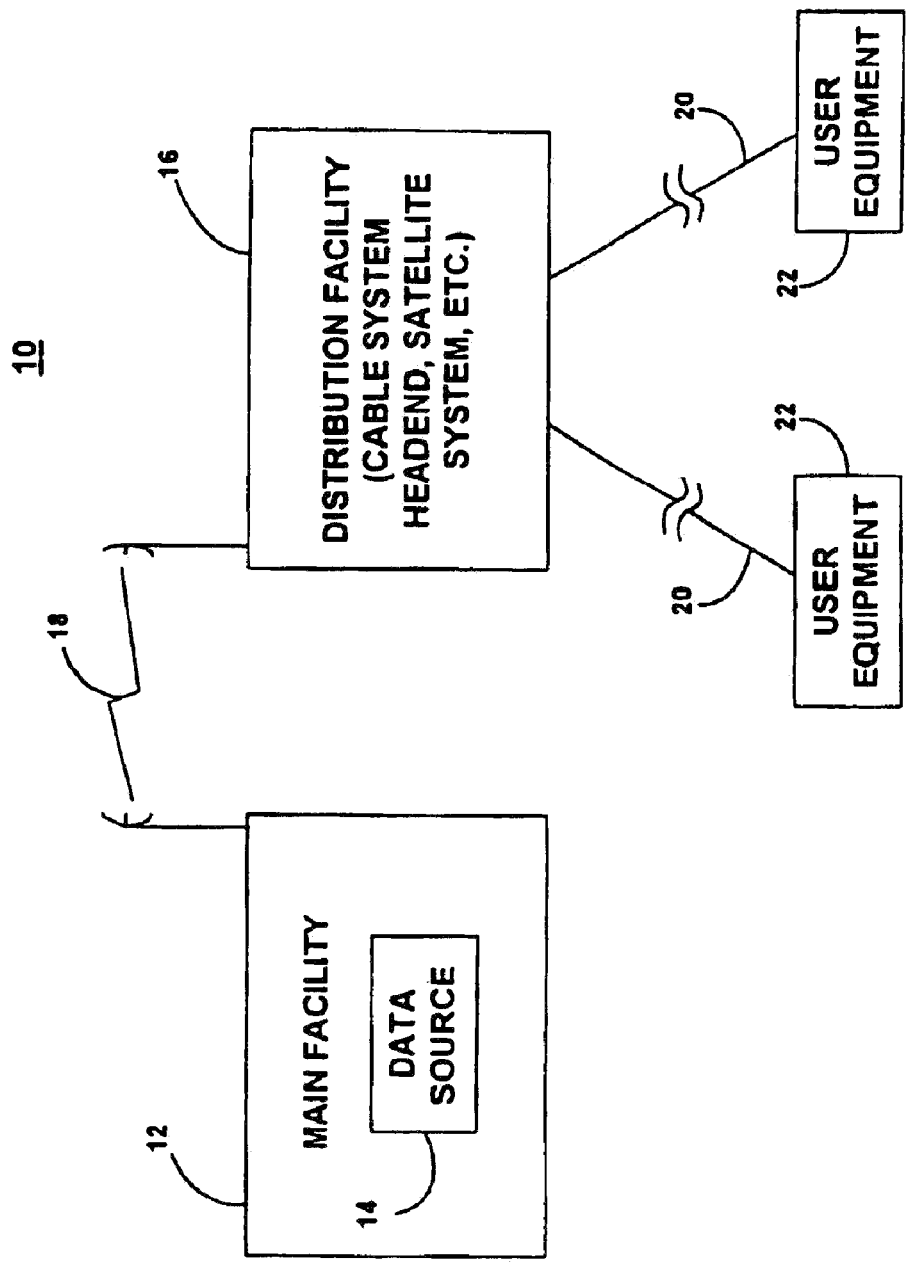
FIG. 3 is a schematic diagram of a system in accordance with the present invention.

An illustrative arrangement for an interactive electronic television program guide system 10 in accordance with the present invention is shown in FIG. 3. Main facility 12 provides data from data source 14 to distribution facility 16 via communications link 18. Link 18 may be a satellite link, a telephone network link, a cable or fiber optic link, a microwave link, a combination of such links, or any other suitable communications path. If it is desired to transmit video signals over link 18 in addition to data signals, a relatively high bandwidth link such as a satellite link may generally be preferred to a relatively low bandwidth link such as a telephone line. Distribution facility 16 may be a cable system headend, a broadcast distribution facility, or a satellite television distribution facility.

The program guide data transmitted by main facility 12 to distribution facility 16 includes television program listings data (e.g., program times, channels, titles), program descriptions data and data for other program guide services, and may include data for additional services. If desired, some data may be provided using data sources at facilities other than main facility 12.

Distribution facility 16 distributes the program guide data and data for other services to multiple users via communications paths 20. Each user has user equipment 22 for displaying television programs, television program listings, program descriptions, and information for other services using an interactive television program guide. Many features of the interactive television program guide are provided by executing instructions with a microprocessor or similar control circuitry 54 (FIG. 6) within user equipment 22. Communications paths 20 preferably have sufficient bandwidth to allow distribution facility 16 to distribute television programming and other video information to user equipment 22. Television programming and video information may also be distributed by distribution facility 16 over communications paths separate from communications paths 20.

Certain program guide functions may require user equipment 22 to transmit data to distribution facility 16 over communications paths 20 (e.g., with a cable modem, telephone modem, or other suitable return link). If desired, return data may be transmitted over separate communications paths (not shown).

Figure 4:
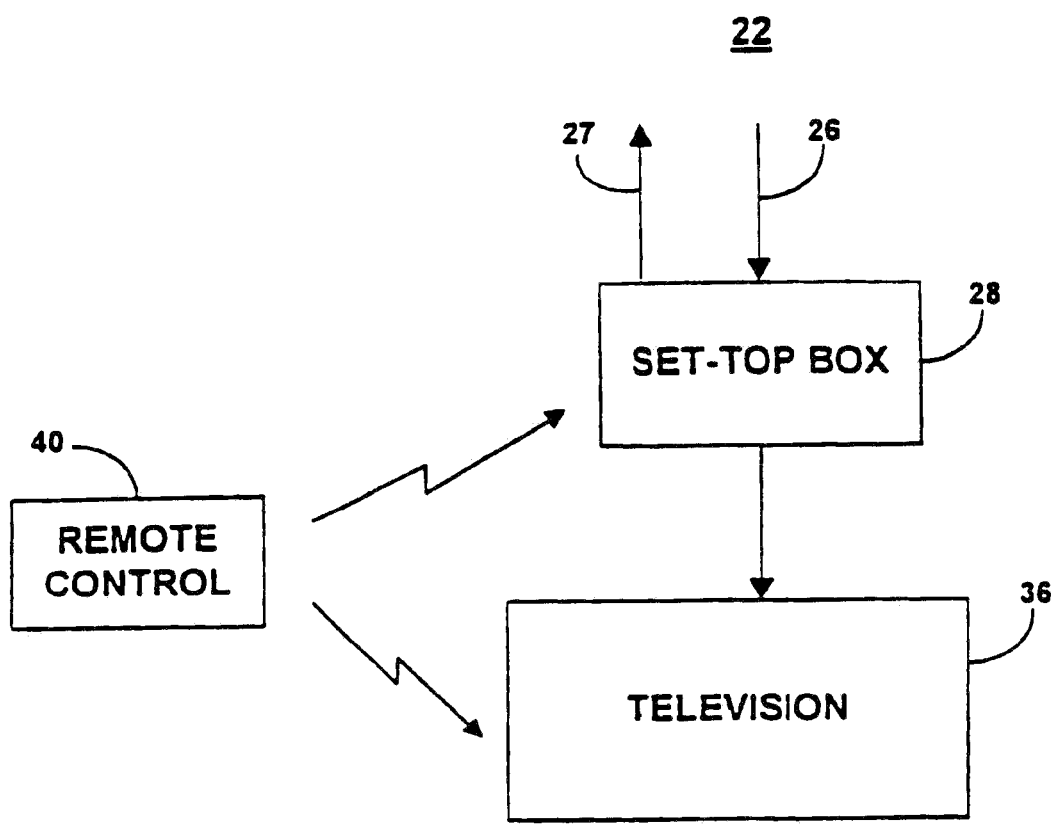
FIG. 4 is a schematic diagram of illustrative user equipment in accordance with the present invention.

An illustrative arrangement for user equipment 22 is shown in FIG. 4. The program guide may be implemented on set-top box 28. The program guide coordinates the display of television programs and television program listings information on television 36. If desired, user television equipment 22 may include a videocassette recorder controlled by the program guide on set-top box 28 for recording selected programs.

Periodically, user equipment 22 of FIG. 4 receives television programming, video information, television program listings information, and other data from television distribution facility 16 of FIG. 3 (or from a separate data stream) at input 26. Information from the user may be transmitted to distribution facility 16 of FIG. 3 via output 27. During normal television viewing, the user tunes set-top box 28 to a desired television channel. Remote control 40 or some other suitable user input device such as a mouse, infrared keyboard, touch pad, voice recognition system, etc. may be used for interacting with the program guide and controlling set-top box 28 and television 36.

Figure 7:
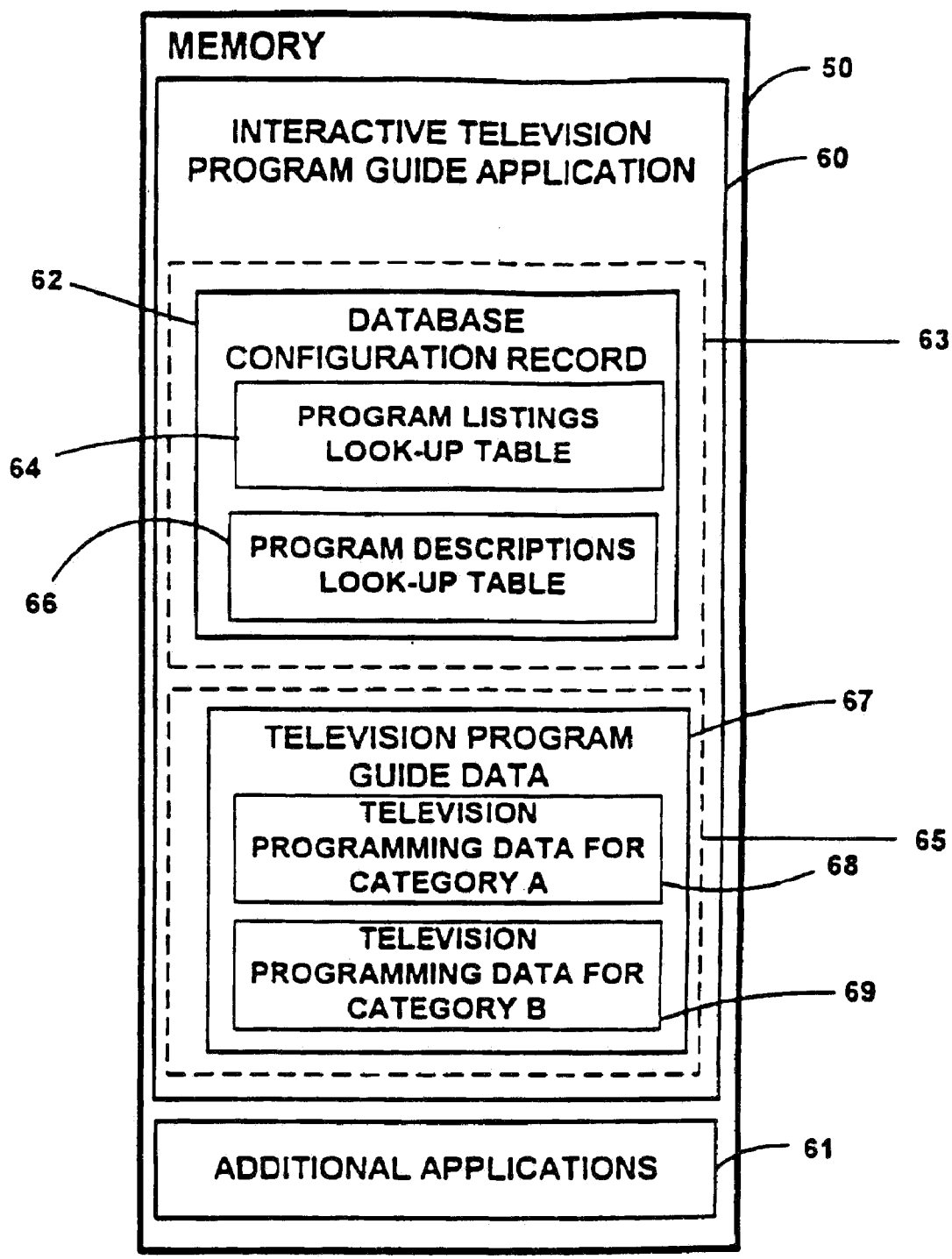
FIG. 7 is a schematic diagram of an illustrative memory arrangement for a set-top box in accordance with the present invention.

The television program guide implemented on set-top box 28 may be downloaded from television distribution facility 16 via communications paths 20. If desired, different versions of the program guide (shown as interactive television program guide application 60 in FIG. 7) may be transmitted to individually addressable set-top boxes, such as set-top boxes of different types, 23 and 24 of FIG. 5.

Figure 6:
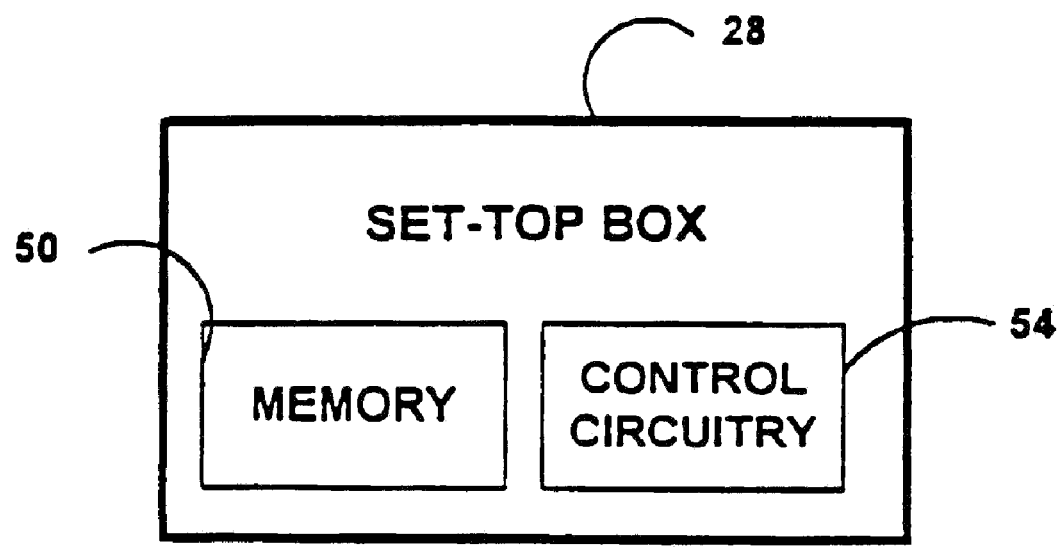
FIG. 6 is a schematic diagram of an illustrative set-top box arrangement in accordance with the present invention.

The circuitry of set-top box 28 of FIG. 4 is shown in more detail in FIG. 6. As shown in FIG. 6, set-top box 28 contains memory 50 for data storage and control circuitry 54 (which is preferably microprocessor-based) for performing the various program guide and other set-top box functions. These functions include responding to user instructions sent via remote control 40 (FIG. 4) and responding to instructions sent by distribution facility 16 (FIG. 3) (e.g., when a new channel line-up is sent by distribution facility 16).

Figure 5:
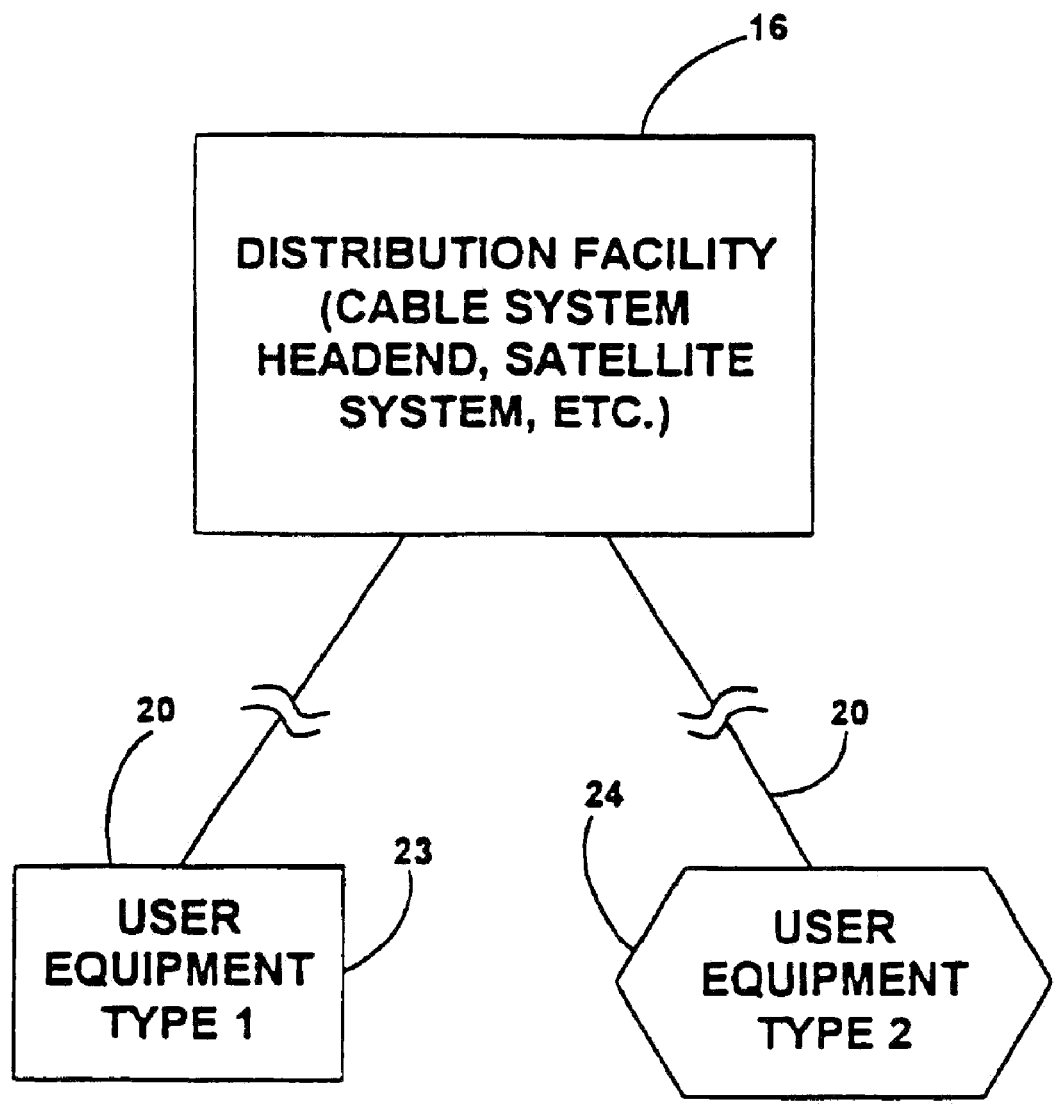
FIG. 5 is a schematic diagram showing two illustrative types of user equipment in accordance with the present invention.

FIG. 5 shows an illustrative configuration of memory 50 in set-top box 28. Memory 50 contains program guide application 60, which includes a database configuration record 62 for allocating television program guide data 67 for various categories of listings information, such as television programming data 68 for category A of programming and television programming data 69 for category B of programming. Categories A and B and other such categories include special events; pay-per-view movies, sporting events, non-pay-per-view movies, or regular programs.

Additional applications 61 (e.g., an Internet browser, a shopping application, etc.) may also be contained in memory if desired. Database configuration record 62 is preferably stored in nonvolatile memory (e.g., rewritable flash memory) as indicated by dotted line 63. This ensures that program guide 60 allocates memory properly after a power loss, because memory allocation information in the nonvolatile database configuration record 62 will not be lost. Television program guide data 67 may be stored in volatile memory (e.g., random access memory), as indicated by dotted line 65. Television program guide data 67 may be reacquired after a power loss, because television program guide data 67 is periodically transmitted to set-top box 28 from television distribution facility 16 (FIG. 3).

Database configuration record 62 uses program listings look-up table 64 and program descriptions look-up table 66 as guides when allocating memory between different types of television program guide data 67. When it is desired to download a new version of the database configuration record 62 to set-top boxes 28, e.g., to make more memory available to accommodate a new application, program guide 60 preferably accesses the newly introduced database configuration record 62 to determine which of the program listings levels 86 of program listings look-up table 80 of FIG. 6 and program descriptions levels 96 of program descriptions look-up table 90 of FIG. 7 coincides with the amount of memory it is desired to use for the program guide application (which relates directly to the amount of memory that will be made available for the new application).

Figure 12:
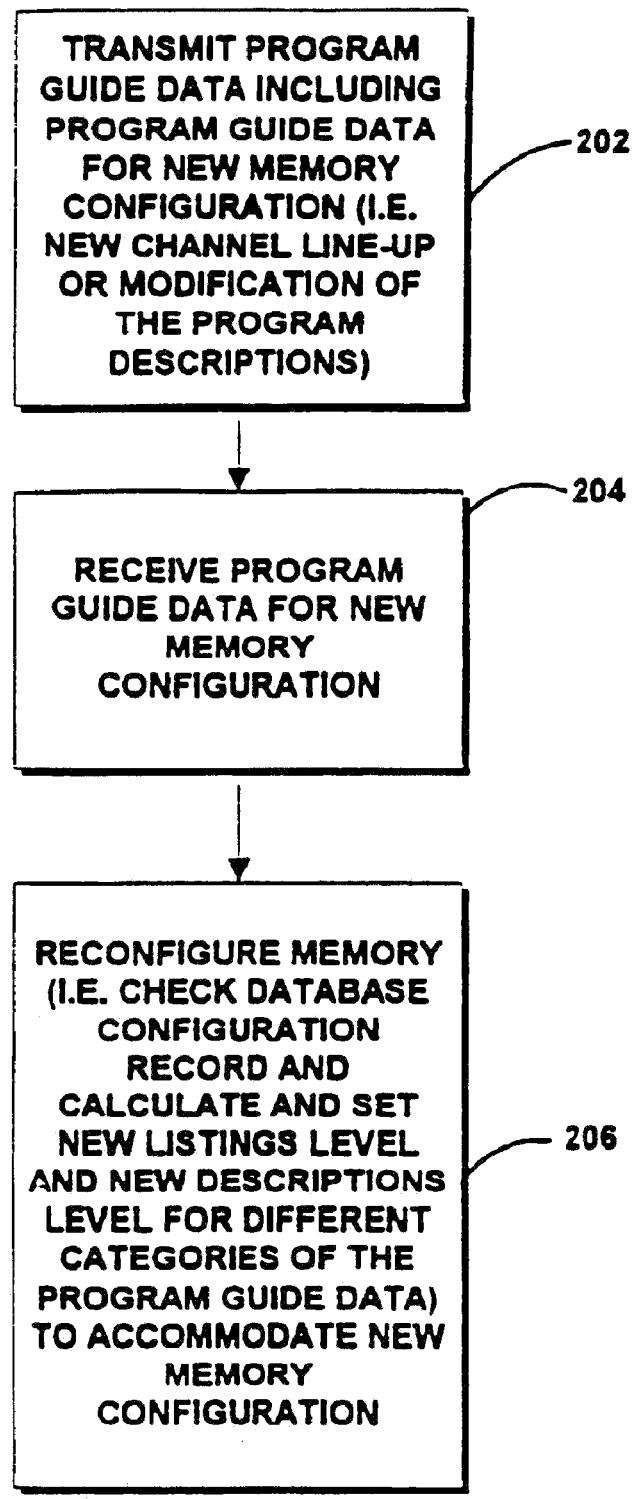
FIG. 12 is a flow chart showing steps involved in reconfiguring the memory in accordance with the present invention.

However, when the configuration of the memory is changed, i.e., new channels are introduced into the cable television line-up or the descriptions of programming are modified (e.g., to change the size of individual descriptions, or to include pictures as part of the descriptions), a new database configuration record is preferably not required (see FIG. 12). Rather, program guide data for a new memory configuration is transmitted to the program guide without a new database configuration record, as shown in box 202. The program guide receives the program guide data for the new memory configuration, as shown in box 204. Thereafter, as shown in box 206, the program guide reconfigures the database by checking the database configuration record for the levels corresponding to the new memory configuration and calculates the program listings level 86 and program descriptions level 96 accordingly to accommodate the new memory configuration.

Program listings table 80 of FIG. 8 and program descriptions table 90 of FIG. 9 show how much data is stored in memory for each category of data and for each level of memory usage. The program guide memory allocation scheme that uses the most memory for the program guide application corresponds to level zero. The program guide memory allocation scheme that uses the least memory for the program guide application corresponds to level 14. At the highest level of program guide memory usage (level zero), listings and descriptions data for special events is available for 30 days into the future. Data for pay-per-view movies, sporting events, non-pay-per-view movies, and regular programs is available for 7 days into the future. The 30 day entry in the level zero "any program" category in table 80 of FIG. 6 and table 90 of FIG. 7 indicates that any program that is more than thirty days into the future should be discarded. The highest level of program guide memory usage is suitable for arrangements in which the program guide application is the only application loaded into set-top boxes 28 and a minimum number of channels is being supported.

Whenever it is desired to remove an application other than program guide application 60 from set-top box 28 (FIG. 4), program guide application 60 may not require a new database configuration record 62. If, however, the increase in memory availability is substantial, a new database configuration record 62 may be sent from television distribution facility 16 (FIG. 3) to establish a higher level of memory usage for listings and descriptions data. This allows the user access to more program listings and descriptions information when using program guide 60.

Whenever it is desired to add an application to set-top boxes 28, database configuration record 62 may be reconfigured at television distribution facility 16 (FIG. 3) and retransmitted to set-top boxes 28. Program listings level 86 may then changed to establish a lower level of memory usage for program guide application 60. Similarly, program descriptions level 96 may then be changed to establish a lower level of memory usage for program guide application 60. This reduces the memory required by program guide application 60 for storing program listings and program descriptions in its database, thereby making more memory available for non-guide applications.

Figure 10:
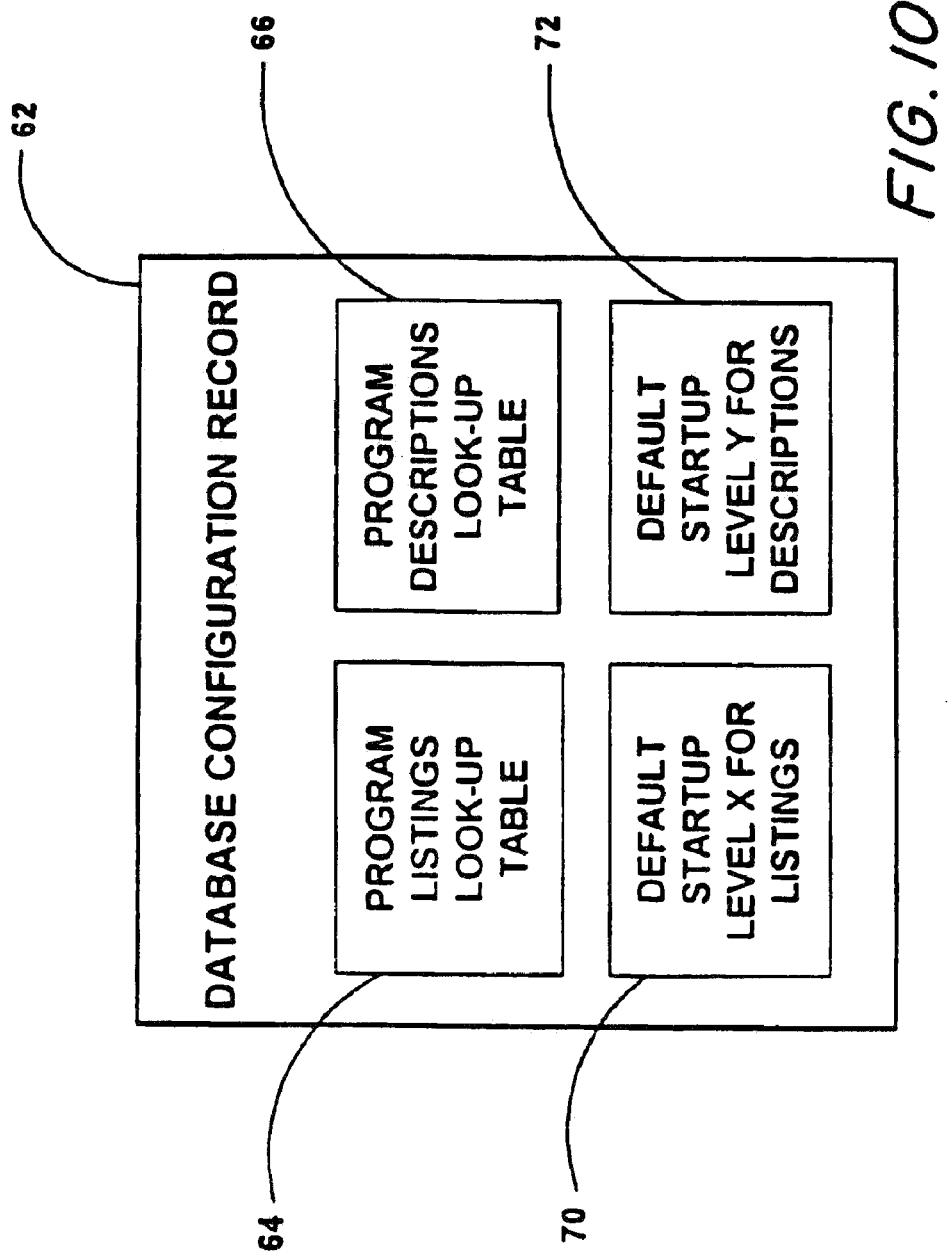
FIG. 10 is a schematic diagram of an illustrative database configuration record in accordance with the present invention.

If desired, database configuration record 62 may specify a default startup level X for program listings 70 and a default startup level Y for program descriptions 72, as shown in FIG. 10 and as indicated by arrows next to the tables of FIGS. 8 and 9. Default startup levels 70 and 72 ensure that when memory 50 in set-top box 28 is initially used to store program guide application 60, the memory is not fragmented by over-allocation of memory followed by truncation to fit a more restrictive storage level. Using default startup levels 70 and 72, data collection may start at a level that requires a relatively small amount of memory. An illustrative set of default startup levels for a system with an available storage capacity of 750 kilobytes is level zero in FIG. 8 for program listings and level six for descriptions in FIG. 9 for program descriptions, as indicated by the arrows 82 and 92 in FIGS. 8 and 9, respectively.

Once the startup routine has been successfully completed, program guide application 60 uses the maximum level of memory allocated to it by database configuration record 62. This memory allocation occurs as new listings and descriptions data is gradually introduced into memory. The initial reduced-allocation approach distributes memory more efficiently on startup of the program guide than allowing program guide application 60 to randomly choose levels on startup or to choose the highest levels available.

Figure 11:
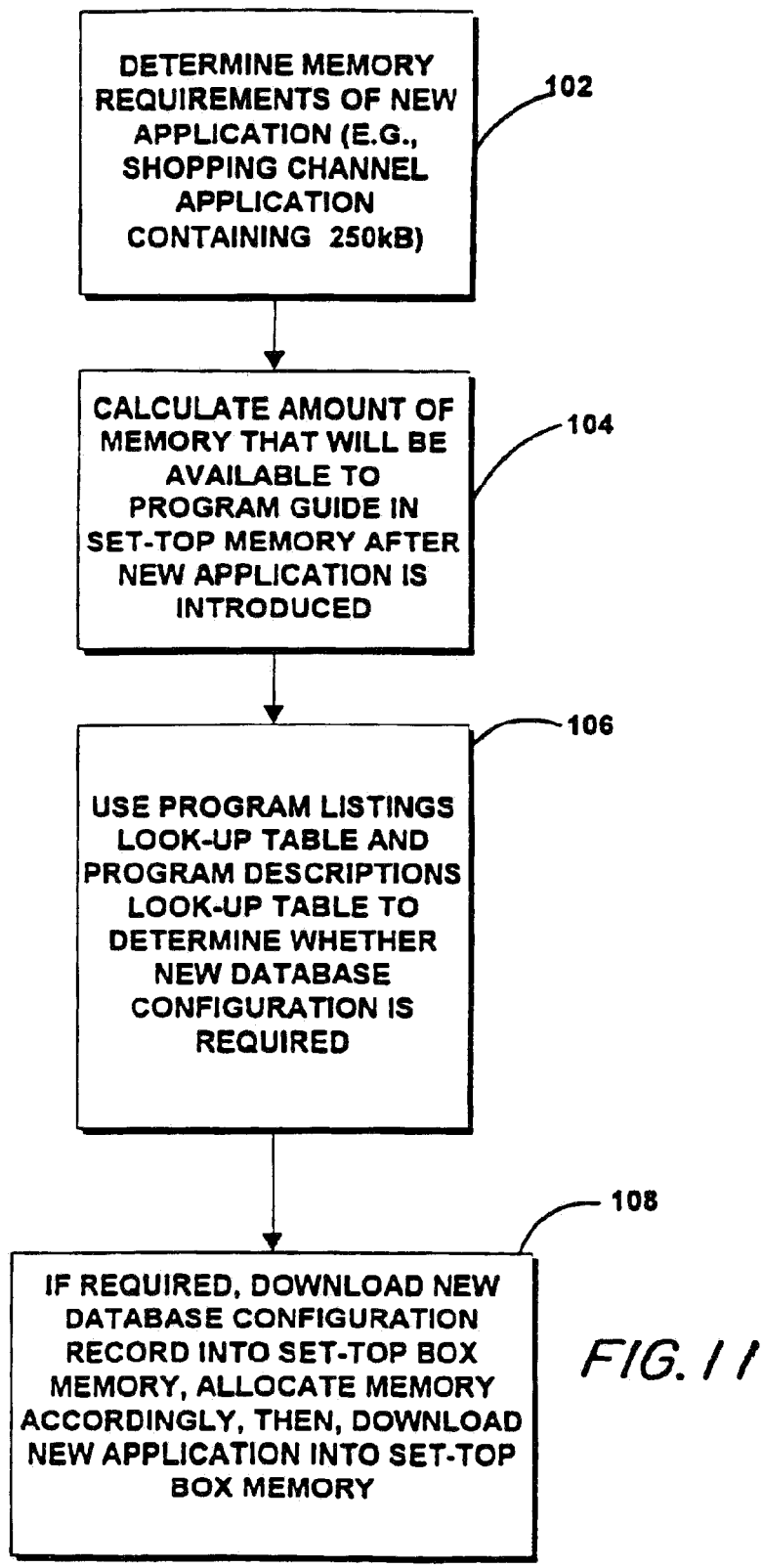
FIG. 11 is a flow chart showing steps involved in introducing a new application to a set-top box in accordance with the present invention.

One suitable approach for adjusting the memory configuration of set-top boxes 28 by changing the amount of memory used by program guide application 60 is illustrated in the flow chart in FIG. 11. The flow chart of FIG. 11 shows how memory can be reallocated to accommodate a new application in set-top box 28 such as a shopping application or an Internet browser application. Because the new application must use some of the limited memory available in set-top box 28, the size of the new application affects the memory that is available in set-top box 28 for program guide application 60. Once the amount of memory needed to run the new application is determined at step 102, a suitable program running at television distribution facility 16 (FIG. 3) is used to determine the amount of memory that will be available for program guide data 67 in set-top box 28 after the new application is installed (step 104). At step 106, the suitable program uses program listings look-up table 80 and program descriptions look-up table 90 to calculate a suitable new program listings level and new program description level to accommodate the new application. The suitable program then changes either the program listings level or the program descriptions level (or both) (step 106). This step 106 may require a new database configuration record 62. The new database configuration record is preferably downloaded first, to structure the memory of the program guide 60. The new application may then be downloaded from television distribution facility 16 into set-top boxes 28 at step 108.

One skilled in the art will appreciate that the present invention can be practiced by other than the described embodiments, which are presented for purposes of illustration and not of limitation, and the present invention is limited only by the claims which follow.

The invention claimed is:

1. An interactive program guide system in which an interactive program guide is implemented on user equipment, comprising:
   memory in the user equipment in which program guide data for use by the interactive program guide is stored; and
   control circuitry in the user equipment, wherein the control circuitry is configured to:
      receive information from a remote source on the amount of memory for the interactive program guide to use to store the program guide data;
      adjust the amount of memory used for storing the program guide data based at least in part on the received information, wherein different types of program guide data are stored in memory; and
      detect a change in a channel line-up and change the allocation of the memory associated with the different types of program guide data in response to the change in the channel line-up;
      determine that additional memory is available for the program guide data in response to changing the allocation of the memory; and
      retrieve additional program-related information for storage using the additional memory.

2. The system of claim 1, wherein the change in channel line-up includes the addition of at least one new channel to the channel line-up.

3. The system of claim 1, wherein the change in channel line-up includes the removal of at least one channel from the channel line-up.

4. The system of claim 1, wherein the control circuitry is configured to adjust the amount of memory used to store the program guide data to accommodate installation of a new application in the user equipment.

5. The system of claim 1, wherein the different types of program guide data include at least program listings and program descriptions.

6. The system of claim 1, wherein the remote source includes a television distribution facility.

7. The system of claim 1, wherein the control circuitry is configured to use one of the different types as a filter to discard any program guide data that concerns programs more than a certain number of days into the future.

8. The system of claim 1, wherein the control circuitry receives a database configuration record from the remote source, the control circuitry configured to allocate memory for the different types of program guide data based at least in part on the database configuration record.

9. The system of claim 1, wherein the program guide data is transmitted from the remote source to the user equipment in a data stream.

10. The system of claim 1, wherein the remote source includes a cable system headend.

11. A memory adjustment method for use in an interactive television program guide system in which an interactive television program guide is implemented on user television equipment that has memory, comprising:
   storing program guide data for use by the interactive television program guide;
   receiving from a remote source information on the amount of memory for the interactive program guide to use to store the program guide data;
   adjusting the amount of memory used for storing the program guide data based at least in part on the received information, wherein different types of program guide data are stored in memory; and
   detecting a change in channel line-up and changing the allocation of the memory associated with the different types of program guide data in response to the change in the channel line-up;
   determining that additional memory is available for the program guide data in response to changing the allocation of the memory; and retrieving additional program-related information for storage using the additional memory.

12. The method of claim 11, wherein the change in channel line-up includes the addition of at least one new channel to the channel line-up.

13. The method of claim 11, wherein the change in channel line-up includes the removal of at least one channel from the channel line-up.

14. The method of claim 11, further comprising a step of adjusting the amount of memory used to store the program guide data to accommodate installation of a new application in the user equipment.

15. The method of claim 11, wherein the different types of program guide data include at least program listings and program descriptions.

16. The method of claim 11, wherein the remote source includes a television distribution facility.

17. The method of claim 11, further comprising a step of using one of the different types as a filter to discard any program guide data that concerns programs more than a certain number of days into the future.

18. The method of claim 11, further comprising a step of receiving a database configuration record from the remote source, the control circuitry configured to allocate memory for the different types of program guide data based at least in part on the database configuration record.

19. The method of claim 11, wherein the program guide data is transmitted from the remote source to the user equipment in a data stream.

20. The method of claim 11, wherein the remote source includes a cable system headend.

* * * * *